Sept. 21, 1954   K. TARDEL   2,689,921
ALTERNATOR
Filed March 8, 1952

INVENTOR:
KURT TARDEL

Patented Sept. 21, 1954

2,689,921

UNITED STATES PATENT OFFICE 2,689,921

ALTERNATOR

Kurt Tardel, Altwarmbuechen, near Hannover, Germany

Application March 8, 1952, Serial No. 275,531

Claims priority, application Germany March 13, 1951

20 Claims. (Cl. 310—112)

The present invention relates to alternators, and more particularly to alternators having a substantially constant terminal voltage irrespective of the load current supplied by the alternator and the power factor thereof.

It is an object of the present invention to provide an alternator of the kind described which is sturdy and able to withstand the mechanical forces acting on the windings thereof.

It is another object of the present invention to reduce the expenses of manufacture of an alternator of the kind described.

It is a further object of the present invention to improve the operation of an alternator of the kind described.

An alternator according to the present invention comprises in its broadest aspect a main generator including a magnet system, a main exciting winding arranged on the magnet system, a main armature forming part of the main generator and having an axis, the main armature being arranged for cooperation with the magnet system and having grooves on the perimeter of the main armature extending in a direction parallel to the axis thereof, a main winding arranged in the grooves of the main armature, an auxiliary generator for supplying exciting current to the exciting winding of the magnet system, an anuxiliary armature forming part of the auxiliary generator and having a smaller diameter than the main armature, the auxiliary armature being grooved on the perimeter thereof, a D. C. winding arranged in the grooves of the auxiliary armature and having a part arranged in the grooves of the main armature nearer to the axis thereof than the main winding, and means for exciting a field in the auxiliary armature, the exciting means being fed by the load current of the main generator.

Preferably the means fed by the load current are designed as an A. C. winding.

A preferred embodiment of the present invention comprises a rotatable shaft, a main generator having a main armature arranged on the shaft and having grooves on the perimeter of the main armature parallel to the shaft, a main A. C. winding arranged in the grooves of the main armature, a magnet system arranged coaxially to the shaft and cooperating with the main armature, a main exciting winding arranged on the magnet system, an auxiliary generator for supplying exciting current to the exciting winding of the magnet system and having an auxiliary armature having a smaller diameter than the main armature and being rigidly connected to the shaft, a commutator rigidly connected to the shaft a first winding arranged on the auxiliary armature and having a part arranged in the grooves of the main armature nearer to the shaft than the main winding, the first winding being connected to the commutator so as to be excited by a direct current, and a second winding arranged on the auxiliary armature, the second winding being excited by the alternating load current of the main generator.

Preferably the parts of the first winding arranged in the grooves of the main armature are formed by leads forming straight continuations of the first winding.

Preferably the commutator is arranged opposite to the second face of the main armature and the auxiliary armature is arranged opposite to the first face of the main armature.

In the preferred embodiment of the present invention an iron ring forms part of the auxiliary generator and is devoid of any winding and serves as a magnetic return path for the field in the auxiliary armature.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 3:
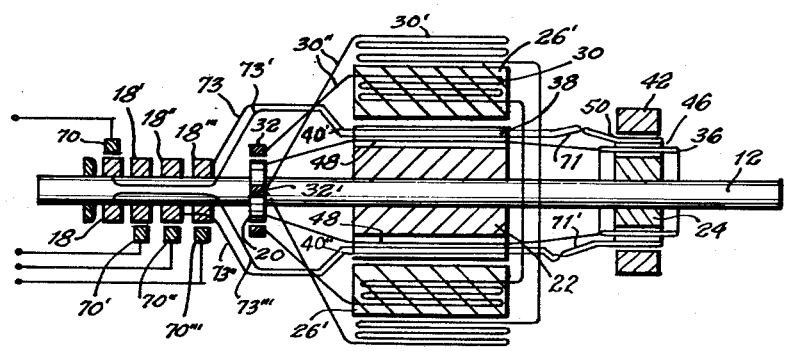
Fig. 3 is a wiring diagram showing the connection of the windings, the commutator, and the slip rings shown in Fig. 1 in a slightly modified embodiment.
Figure 1:
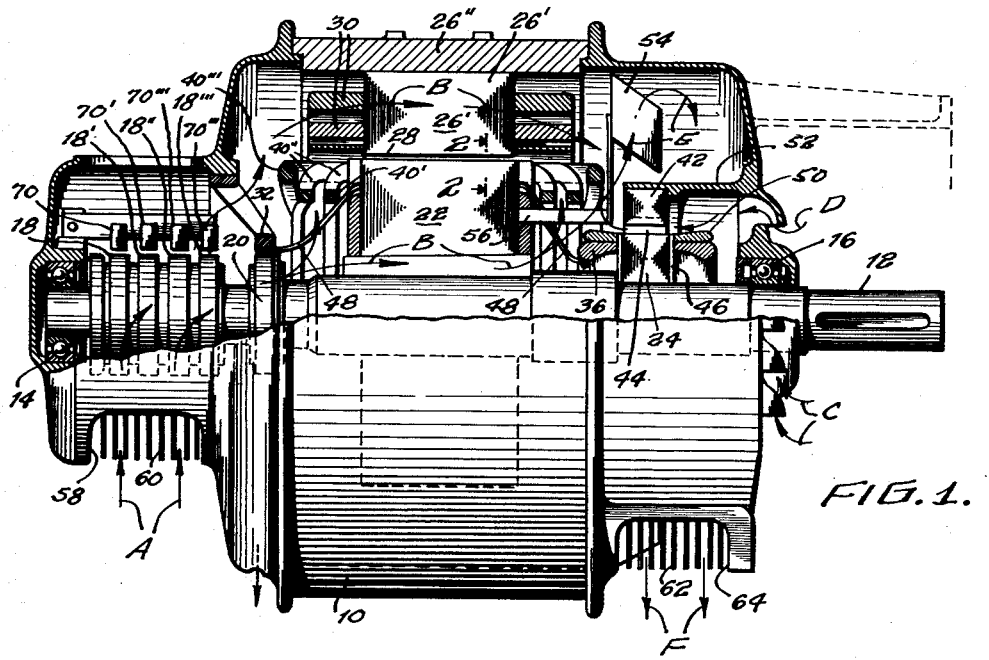
Fig. 1 is a side elevation, partly in section of an alternator according to the present invention.
Figure 2:
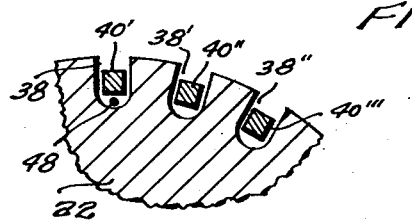
Fig. 2 is a cross-section taken along the line 2—2 of Fig. 1.

Referring now to the drawing and first to Figs. 1 and 3, the alternator is shown as a three-phase generator which is enclosed in a casing or frame 10 in which a shaft 12 is rotatably supported by ball bearings 14 and 16. The shaft 12 carries four slip rings 18, 18', 18'', 18'''. Furthermore, a commutator 20, a main armature 22 and an auxiliary armature 24 are rigidly connected to the shaft 12. The auxiliary armature 24 has a diameter which is much smaller than that of the main armature 22, the ratio of the diameters being about 1:2. The main armature 22 forms part of a three-phase generator termed hereinafter the main generator having a magnet system 26 arranged rigidly in the frame 10 and coaxially to the shaft 12. The magnet system 26 consists of individual magnet poles 26' separated from the main armature by a small air gap 28 and connected by a magnetic part 26" of the frame 10. One or more exciting windings 30, 30' (Fig. 3) are arranged on the magnet poles 26' and connected by connections such as 30" shown in Fig. 3 to the brushes such as 32 cooperating with the segments of the commutator 20 which is connected in the manner to be described more in detail hereinafter to an armature winding 36 (termed hereinafter the first winding) arranged on the auxiliary armature 24. The main armature 22 has a plurality of grooves 38, 38', 38" etc. (see also Fig. 2) extending parallel to the shaft 12 and accommodating, respectively, the main three-phase windings 40', 40", 40''' which are connected by connections such as 70—73''' shown in Fig. 3 to the slip rings 18, 18', 18", 18''', respectively, from which the three-phase current is taken off by means of brushes 70—70''', respectively, the slip ring 18 and the brush 70 associated therewith corresponding to the star-point of the three-phase voltage supplied by the main generator.

The auxiliary generator is a D. C. generator supplying a current energizing the exciting winding 30 of the main generator. The auxiliary generator comprises an unwound iron ring 42 arranged coaxially with the shaft 12 and surrounding the auxiliary armature 24 with a small air gap 44 left between them. The auxiliary armature 24 is provided with a plurality of grooves 46 extending parallel to the shaft 12 and serving for the accommodation of the D. C. winding 36 connected by connections or leads such as 48 to the segments of the commutator 20. The connections or leads 48 pass through the grooves 38 of the main armature 22 and are arranged nearer to the axis of the shaft 12 than the main three-phase winding 40', 40", 40''' of the alternator. Furthermore, the grooves 46 of the auxiliary armature 24 accommodate a three-phase winding 50 which carries a current equal to the load current of the main generator to which end the three-phase winding 50 is connected in series to the main winding 40', 40", 40''' by connections, two of which, 71' and 71", are shown in Fig. 3.

The axial length of the auxiliary or exciting generator is only a small fraction, e. g. one quarter of that of the main generator. The iron ring 42 is shown in the drawings as stationary and is supported by an inturned flange 52 of the frame 10. However, it should be understood that, if desired, the iron ring 42 can rotate together with the auxiliary armature 24 in which case the iron ring 42 should be supported by brackets (not shown) rigid with the shaft 12. Also the ring 42 can be provided with poles, if desired.

A fan 54 is arranged so as to surround the auxiliary generator, and rigidly connected by brackets 56 with the main armature 22. The frame 10 is provided underneath the slip rings 18, 18', 18", 18''' with an opening 58 provided with baffles 60 through which cooling air can enter in the direction of the arrows A, said cooling air traversing the main generator as indicated by the arrows B. Also air is sucked in at the right-hand end of the alternator as indicated by the arrows C and D and passes through the auxiliary generator and merges eventually with the main air flow through the main generator. The merged air stream passes through the fan 54 as indicated by the arrows E and is discharged in the direction of the arrows F through the baffles 62 arranged in an outlet opening 64 of the frame 10.

The operation of the alternator is as follows:

The auxiliary generator supplies by means of the winding 36 a voltage to the commutator 20 which is fed through the brushes 32 thereof to the exciting winding 30 of the magnet system 26 of the main generator. The voltage supplied by the commutator 20 to the exciting winding 30 depends on the load current flowing through the three-phase winding 50 of the auxiliary generator so that the three-phase voltage taken from the slip rings 18', 18", 18''' is substantially constant at any load and independent of the power factor.

It should be noted that the auxiliary generator has very small dimensions in comparison to those of the main generator, the diameters of the auxiliary armature 24 and the iron ring 42 being much smaller than those of the corresponding parts 22 and 26 of the main generator. In consequence thereof the alternator according to the invention is very inexpensive to manufacture since the same needs only a minimal amount of iron and copper. Furthermore, the windings 36 and the leads 48 thereof are arranged nearer to the axis of the shaft 12 than the three-phase windings 50 and 40', 40", 40''' which are traversed by alternating currents proportional to the load of the alternator. Thus winding 36 consisting of turns of very thin wire in comparison to those of the three-phase windings 50 and 40', 40", 40". and the leads 48 of the winding 36 are not exposed to the strong centrifugal forces acting on the heavy windings 40', 40", 40''' and 50 so that the winding 36 and the leads 48 thereof consisting of relatively thin wire are not damaged even if the shaft 12 revolves at a high speed.

The field winding 30 may consist of two separate coils 30a and 30b which are connected, respectively, to pairs of brushes 32, 32' of the commutator 20 staggered by 90° as shown in Fig. 3.

It should be understood that the main generator can also be designed as a single phase generator in which case the three-phase winding 50 of the auxiliary generator is designed as a single-phase winding connected in series to the single-phase main winding of the main generator.

It will be understood that each of the elements described above, or two or more together, may also find a useful application in other types of alternators differing from the types described above.

While the invention has been illustrated and described as embodied in an alternator having a substantially constant terminal voltage, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An alternator, comprising, in combination, a main generator including a magnet system; a main exciting winding arranged on said magnet system; a main armature forming part of said main generator and having an axis, said main armature being arranged for cooperation with said magnet system and having grooves on the perimeter of said main armature extending in a direction parallel to said axis thereof; a main winding arranged in said grooves of said main armature; an auxiliary generator for supplying exciting current to said exciting winding of said magnet system; an auxiliary armature forming part of said auxiliary generator and having a smaller diameter than said main armature, said auxiliary armature being grooved on the perimeter thereof; a D. C. winding arranged in said grooves of said auxiliary armature and having leads arranged in said grooves of said main armature nearer to the axis thereof than said main winding; and means arranged in coaxial relation to said D. C. winding for exciting a field in said auxiliary armature, said exciting means being fed by the load current of said main generator.

2. An alternator, comprising, in combination, a main generator including a magnet system; a main exciting winding arranged on said magnet system; a main armature forming part of said main generator and having an axis, said main armature being arranged for cooperation with said magnet system and having grooves on the perimeter of said main armature extending in a direction parallel to said axis thereof; a main winding arranged in said grooves of said main armature; an auxiliary generator for supplying exciting current to said exciting winding of said magnet system; an auxiliary armature forming part of said auxiliary generator and having a smaller diameter than said main armature, said auxiliary armature being grooved on the perimeter thereof; a D. C. winding arranged in said grooves of said auxiliary armature and having leads arranged in said grooves of said main armature nearer to the axis thereof than said main winding; and an A. C. winding having less ampere turns than said main winding for exciting a field in said auxiliary armature, said A. C. winding being fed by the load current of said main generator.

3. An alternator, comprising, in combination, a main generator including a magnet system; a main exciting winding arranged on said magnet system; a main armature forming part of said main generator and having an axis, said main armature being arranged for cooperation with said magnet system and having grooves on the perimeter of said main armature extending in a direction parallel to said axis thereof; a main winding arranged in said grooves of said main armature; an auxiliary generator for supplying exciting current to said exciting winding of said magnet system; an auxiliary armature forming part of said auxiliary generator and having a smaller diameter than said main armature, said auxiliary armature being grooved on the perimeter thereof; a D. C. winding arranged in said grooves of said auxiliary armature and having leads arranged in said grooves of said main armature nearer to the axis thereof than said main winding; and means arranged in coaxial relation to said D. C. winding for exciting a field in said auxiliary armature, said exciting means being fed by the load current of said main generator.

4. An alternator, comprising, in combination, a main generator including a magnet system; a main exciting winding arranged on said magnet system; a main armature forming part of said main generator and having an axis, said main armature being arranged for cooperation with said magnet system and having grooves on the perimeter of said main armature extending in a direction parallel to said axis thereof; a main winding arranged in said grooves of said main armature; an auxiliary generator for supplying exciting current to said exciting winding of said magnet system; an auxiliary armature forming part of said auxiliary generator and having a smaller diameter than said main armature, said auxiliary armature being grooved on the perimeter thereof; a D. C. winding arranged in said grooves of said auxiliary armature and having leads arranged in said grooves of said main armature nearer to the axis thereof than said main winding; and an A. C. winding having less ampere turns than said main winding for exciting a field in said auxiliary armature, said A. C. winding being fed by the load current of said main generator.

5. An alternator, comprising, in combination, a rotatable shaft; a main generator having a main armature arranged on said shaft and having grooves on the perimeter of said main armature parallel to said shaft; a main A. C. winding arranged in said grooves of said main armature; a magnet system arranged coaxially to said shaft and cooperating with said main armature; a main exciting winding arranged on said magnet system; an auxiliary generator for supplying exciting current to said exciting winding of said magnet system and having an auxiliary armature having a smaller diameter than said main armature and being rigidly connected to said shaft; a commutator rigidly connected to said shaft; a first winding arranged on said auxiliary armature and having leads arranged in said grooves of said main armature nearer to said shaft than said main winding, said first winding being connected to said commutator so as to be excited by a direct current; and a second winding arranged on said auxiliary armature, said first and second windings having less ampere turns than said main winding, said second winding being excited by the alternating load current of said main generator.

6. An alternator, comprising, in combination, a rotatable shaft; a main generator having a main armature arranged on said shaft and having grooves on the perimeter of said main armature parallel to said shaft; a main A. C. winding arranged in said grooves of said main armature; a magnet system arranged coaxially to said shaft and cooperating with said main armature; a main exciting winding arranged on said magnet system; an auxiliary generator for supplying exciting current to said exciting winding of said magnet system and having an auxiliary armature having a smaller diameter than said main armature and being rigidly connected to said shaft; a commutator rigidly connected to said shaft; a first winding arranged on said auxiliary armature and having leads arranged in said grooves of said main armature nearer to said shaft than said main winding, said leads forming straight continuations of said first winding, said first winding being connected to said commutator so as to be excited by a direct current; and a second winding arranged on said auxiliary armature, said first and second windings having less ampere turns than said main winding, said second winding being excited by the alternating load current of said main generator.

7. An alternator, comprising, in combination, a rotatable shaft; a main generator having a main armature arranged on said shaft and having grooves on the perimeter of said main armature parallel to said shaft; a main A. C. winding arranged in said grooves of said main armature; a magnet system arranged coaxially to said shaft and cooperating with said main armature; a main exciting winding arranged on said magnet system; an auxiliary generator for supplying exciting current to said exciting winding of said magnet system and having an auxiliary armature having a smaller diameter than said main armature and being rigidly connected to said shaft; a commutator rigidly connected to said shaft; a first winding arranged on said auxiliary armature and having leads arranged in said grooves of said main armature nearer to said shaft than said main winding, said leads forming straight continuations of said first winding, said leads being connected to said commutator so that said first winding is excited by a direct current; and a second winding arranged on said auxiliary armature, said first and second windings having less ampere turns than said main winding, said second winding being excited by the alternating load current of said main generator.

8. An alternator, comprising, in combination, a rotatable shaft; a main generator having a main armature arranged on said shaft and having grooves on the perimeter of said main armature parallel to said shaft, said main armature having a first end face and a second end face; a main A. C. winding arranged in said grooves of said main armature; a magnet system arranged coaxially to said shaft and cooperating with said armature; a main exciting winding arranged on said magnet system; an auxiliary generator for supplying exciting current to said exciting winding of said magnet system and having an auxiliary armature having a smaller diameter than said main armature and being rigidly connected to said shaft, said auxiliary armature being arranged opposite to said first face of said main armature; a commutator rigidly connected to said shaft and arranged opposite to said second face of said main armature; a first winding arranged on said auxiliary armature and having a part arranged in said grooves of said main armature nearer to said shaft than said main winding, said first winding being connected to said commutator; and a second winding arranged on said auxiliary armature in coaxial relation to said first winding, said first and second windings having less ampere turns than said main winding, said second winding being excited by the alternating load current of said main generator.

9. An alternator, comprising, in combination, a rotatable shaft; a main generator having a main armature arranged on said shaft and having grooves on the perimeter of said main armature parallel to said shaft, said main armature having a first end face and a second end face; a main A. C. winding arranged in said grooves of said main armature; a magnet system arranged coaxially to said shaft and cooperating with said armature; a main exciting winding arranged on said magnet system; an auxiliary generator for supplying exciting current to said exciting winding of said magnet system and having an auxiliary armature having a smaller diameter than said main armature and being rigidly connected to said shaft, said auxiliary armature being arranged opposite to said first face of said main armature; a commutator rigidly connected to said shaft and arranged opposite to said second face of said main armature; a first winding arranged on said auxiliary armature and having leads arranged in said grooves of said main armature nearer to said shaft than said main winding, said leads connecting said first winding with said commutator; and a second winding arranged on said auxiliary armature in coaxial relation to said first winding so as to induce a voltage therein, said second winding being excited by the alternating load current of said main generator.

10. An alternator, comprising, in combination, a main generator including a magnet system; a main exciting winding arranged on said magnet system; a main armature forming part of said main generator and having an axis, said main armature being arranged for cooperation with said magnet system and having grooves on the perimeter of said main armature extending in a direction parallel to said axis thereof; a main winding arranged in said grooves of said main armature; an auxiliary generator for supplying exciting current to said exciting winding of said magnet system; an auxiliary armature forming part of said auxiliary generator and having a smaller diameter than said main armature, said auxiliary armature being grooved on the perimeter thereof; a D. C. winding arranged in said grooves of said auxiliary armature and having leads arranged in said grooves of said main armature nearer to the axis thereof than said main winding; means for exciting a field in said auxiliary armature, said means being arranged in coaxial relation to said D. C. winding, said exciting means being fed by the load current of said main generator; and an iron ring forming part of said auxiliary generator, said iron ring being devoid of any winding and serving as a magnetic return path for the field in said auxiliary armature, said iron ring having an outer diameter being less than the diameter of said main armature.

11. An alternator, comprising, in combination, a main generator including a magnet system; a main exciting winding arranged on said magnet system; a main armature forming a part of said main generator and having an axis, said main armature being arranged for cooperation with said magnet system and having grooves on the perimeter of said main armature extending in a direction parallel to said axis thereof; a main winding arranged in said grooves of said main armature; an auxiliary generator for supplying exciting current to said exciting winding of said magnet system; an auxiliary armature forming part of said auxiliary generator and having a smaller diameter than said main armature, said auxiliary armature being grooved on the perimeter thereof; a D. C. winding arranged in said grooves of said auxiliary armature and having leads arranged in said grooves of said main armature nearer to the axis thereof than said main winding, said leads forming straight continuations of said D. C. winding; and means for exciting a field in said auxiliary armature, said means being arranged in coaxial relation to said D. C. winding said exciting means being fed by the load current of said main generator.

12. An alternator, comprising, in combination, a main generator including a magnet system; a main exciting winding arranged on said magnet system; a main armature forming part of said main generator and having an axis, said main armature being arranged for cooperation with said magnet system and having grooves on the perimeter of said main armature extending in a direction parallel to said axis thereof; a main winding arranged in said grooves of said main armature; an auxiliary generator for supplying exciting current to said exciting winding of said magnet system; an auxiliary armature forming part of said auxiliary generator and having a smaller diameter than said main armature, said auxiliary armature being grooved on the perimeter thereof; a D. C. winding arranged in said grooves of said auxiliary armature, said D. C. winding having less ampere turns than said main winding and having leads arranged in said grooves of said main armature nearer to the axis thereof than said main winding, said leads forming straight continuations of said D. C. winding; and an A. C. winding arranged in coaxial relation to said D. C. winding so as to induce a voltage therein, said A. C. winding being fed by the load current of said main generator.

13. An alternator, comprising, in combination, a rotatable shaft; a main generator having a main armature arranged on said shaft and having grooves on the perimeter of said main armature parallel to said shaft; a main A. C. winding arranged in said grooves of said main armature; a magnet system arranged coaxially to said shaft and cooperating with said main armature; a main exciting winding arranged on said magnet system; an auxiliary generator for supplying exciting current to said exciting winding of said magnet system and having an auxiliary armature having a smaller diameter than said main armature and being rigidly connected to said shaft; a commutator rigidly connected to said shaft; a first winding arranged on said auxiliary armature and having a part arranged in said grooves of said main armature nearer to said shaft than said main winding, said first winding being connected to said commutator; a second winding arranged on said auxiliary armature in coaxial relation to said first winding so as to induce a voltage therein, said second winding being excited by the alternating load current of said main generator; and an iron ring forming part of said auxiliary generator and arranged coaxially to said shaft and said auxiliary armature rigidly connected thereto, said iron ring being devoid of any winding and serving as a magnetic return path for the field excited in said auxiliary armature, said iron ring having an outer diameter being less than the diameter of said main armature.

14. An alternator, comprising, in combination, a rotatable shaft; a main generator having a main armature arranged on said shaft and having grooves on the perimeter of said main armature parallel to said shaft, said main armature having a first end face and a second end face; a main A. C. winding arranged in said grooves of said main armature; a magnet system arranged coaxially to said shaft and cooperating with said armature; a main exciting winding arranged on said magnet system; an auxiliary generator for supplying exciting current to said exciting winding of said magnet system and having an auxiliary armature having a smaller diameter than said main armature and being rigidly connected to said shaft, said auxiliary armature being arranged opposite to said first face of said main armature; a commutator rigidly connected to said shaft and arranged opposite to said second face of said main armature; a first winding arranged on said auxiliary armature and having a part arranged in said grooves of said main armature nearer to said shaft than said main winding, said first winding being connected to said commutator; a second winding arranged on said auxiliary armature, said first and second windings having less ampere turns than said main winding, said second winding being excited by the alternating load current of said main generator; and an iron ring forming part of said auxiliary generator and arranged coaxially to said shaft and said auxiliary armature rigidly connected thereto, said iron ring being devoid of any winding and serving as a magnetic return path for the field excited in said auxiliary armature, said iron ring having an outer diameter being less than the diameter of said main armature.

15. An alternator, comprising, in combination, a rotatable shaft; a main generator having a main armature arranged on said shaft and having grooves on the perimeter of said main armature parallel to said shaft, said main armature having a first end face and a second end face; a main A. C. winding arranged in said grooves of said main armature; a magnet system arranged coaxially to said shaft and cooperating with said armature; a main exciting winding arranged on said magnet system; an auxiliary generator for supplying exciting current to said exciting winding of said magnet system and having an auxiliary armature having a smaller diameter than said main armature and being rigidly connected to said shaft, said auxiliary armature being arranged opposite to said first face of said main armature; a commutator rigidly connected to said shaft and arranged opposite to said second face of said main armature; a first winding arranged on said auxiliary armature and having leads arranged in said grooves of said main armature nearer to said shaft than said main winding, said leads connecting said first winding with said commutator; a second winding arranged on said auxiliary armature in coaxial relation to said first winding so as to induce a voltage therein, said second winding being excited by the alternating load current of said main generator; and an iron ring forming part of said auxiliary generator and arranged coaxially to said shaft and said auxiliary armature rigidly connected thereto, said iron ring being devoid of any winding and serving as a magnetic return path for the field excited in said auxiliary armature, said iron ring having an outer diameter being less than the diameter of said main armature.

16. An alternator, comprising, in combination, a rotatable shaft; a main generator having a main armature arranged on said shaft and having grooves on the perimeter of said main armature parallel to said shaft; a main A. C. winding arranged in said grooves of said main armature; a magnet system arranged coaxially to said shaft and cooperating with said main armature; a main exciting winding arranged on said magnet system; an auxiliary generator for supplying exciting current to said exciting winding of said magnet system and having an auxiliary armature having a smaller diameter than said main armature and being rigidly connected to said shaft; a commutator rigidly connected to said shaft; a first winding arranged on said auxiliary armature and having a part arranged in said grooves of said main armature nearer to said shaft than said main winding, said first winding being connected to said commutator; a second winding arranged on said auxiliary armature in coaxial relation to said first winding, said second winding being excited by the alternating load current of said main generator; an iron ring forming part of said auxiliary generator and arranged coaxially to said shaft and said auxiliary armature rigidly connected thereto, said iron ring being devoid of any winding and serving as a magnetic return path for the field excited in said auxiliary armature, said iron ring having an outer diameter being less than the diameter of said main armature; and means for rigidly connecting said iron ring with said auxiliary armature.

17. An alternator, comprising, in combination, a rotatable shaft; a main generator having a main armature arranged on said shaft and having grooves on the perimeter of said main armature parallel to said shaft, said main armature having a first end face and a second end face; a main A. C. winding arranged on said grooves of said main armature; a magnet system arranged coaxially to said shaft and cooperating with said armature; a main exciting winding arranged on said magnet system; an auxiliary generator for supplying exciting current to said exciting winding of said magnet system and having an auxiliary armature having a smaller diameter than said main armature and being rigidly connected to said shaft, said auxiliary armature being arranged opposite to said first face of said main armature; a commutator rigidly connected to said shaft and arranged opposite to said second face of said main armature; a first winding arranged on said auxiliary armature and having a part arranged in said grooves of said main armature nearer to said shaft than said main winding, said first winding being connected to said commutator; a second winding arranged on said auxiliary armature, and having less ampere turns than said main winding on said main armature, said second winding being excited by the alternating load current of said main generator; an iron ring forming part of said auxiliary generator and arranged coaxially to said shaft and said auxiliary armature rigidly connected thereto, said iron ring being devoid of any winding and serving as a magnetic return path for the field excited in said auxiliary armature, said iron ring having an outer diameter being less than the diameter of said main armature; and means for rigidly connecting said iron ring with said auxiliary armature.

18. An A. C. generator, comprising, in combination, a stationary frame; a shaft arranged in said frame for rotation; a main generator arranged in said frame, said main generator having a main armature arranged on said shaft and having grooves on the perimeter of said main armature parallel to said shaft; a main A. C. winding arranged in said grooves of said main armature; a magnet system arranged coaxially to said shaft and cooperating with said main armature; a main exciting winding arranged on said magnet system; an auxiliary generator arranged in said frame for supplying exciting current to said exciting winding of said magnet system and having an auxiliary armature having a smaller diameter than said main armature and being rigidly connected to said shaft; a commutator rigidly connected to said shaft inside said frame; a first winding arranged on said auxiliary armature and having a part arranged in said grooves of said main armature nearer to said shaft than said main winding, said first winding being connected to said commutator; a second winding arranged on said auxiliary armature in coaxial relation to said first winding, said second winding being excited by the alternating load current of said main generator; and an iron ring forming part of said auxiliary generator and rigidly connected to said frame, said iron ring being arranged coaxially to said shaft and said auxiliary armature rigidly connected thereto and being devoid of any winding, said iron ring serving as a magnetic return path for the field excited in said auxiliary armature, said iron ring having an outer diameter being less than the diameter of said main armature.

19. An A. C. generator, comprising, in combination, a stationary frame; a shaft arranged in said frame for rotation; a main generator arranged in said frame, said main generator having a main armature arranged on said shaft and having grooves on the perimeter of said main armature parallel to said shaft; a main A. C. winding arranged in said grooves of said main armature; a magnet system arranged coaxially to said shaft and cooperating with said main armature; a main exciting winding arranged on said magnet system; an auxiliary generator arranged in said frame for supplying exciting current to said exciting winding of said magnet system and having an auxiliary armature having a smaller diameter than said main armature and being rigidly connected to said shaft; a commutator rigidly connected to said shaft inside said frame; a first winding arranged on said auxiliary armature and having a part arranged in said grooves of said main armature nearer to said shaft than said main winding, said first winding being connected to said commutator so as to be excited by a direct current; a second winding arranged on said auxiliary armature, said second winding being excited by the alternating load current of said main generator; an iron ring forming part of said auxiliary generator and rigidly connected to said frame, said iron ring being arranged coaxially to said shaft and said auxiliary armature rigidly connected thereto and being devoid of any winding, said iron ring serving as a magnetic return path for the field excited in said auxiliary armature, said iron ring having an outer diameter being less than the diameter of said main armature; and a fan driven by said main armature and having a diameter exceeding the outer diameter of said iron ring, said fan being arranged so as to surround said iron ring and sucking air through said main generator and said auxiliary generator and discharging the air through an opening of said stationary frame to the atmosphere.

20. An A. C. generator, comprising, in combination, a stationary frame; a shaft arranged in said frame for rotation; a main generator arranged in said frame, said main generator having a main armature arranged on said shaft and having grooves on the perimeter of said main armature parallel to said shaft; a main A. C. winding arranged in said grooves of said main armature, said main armature having a first end face and a second end face; a magnet system arranged coaxially to said shaft and cooperating with said main armature; a main exciting winding arranged on said magnet system; an auxiliary generator arranged in said frame for supplying exciting current to said exciting winding of said magnet system and having an auxiliary armature having a smaller diameter than said main armature and being rigidly connected to said shaft, said auxiliary armature being arranged opposite to said first face of said main armature; a commutator rigidly connected to said shaft inside said frame, and arranged opposite to said second face of said main armature; a first winding arranged on said auxiliary armature and having a part arranged in said grooves of said main armature nearer to said shaft than said main winding, said first winding being connected to said commutator so as to be excited by a direct current; a second winding arranged on said auxiliary armature, said second winding being excited by the alternating load current of said main generator; an iron ring forming part of said auxiliary generator and rigidly connected to said frame, said iron ring being arranged coaxially to said shaft and said auxiliary armature rigidly connected thereto and being devoid of any winding, said iron ring serving as a magnetic return path for the field excited in said auxiliary armature, said iron ring having an outer diameter being less than the diameter of said main armature; and a fan driven by said main armature and having a diameter exceeding the outer diameter of said iron ring, said fan being arranged so as to surround said iron ring and sucking air through said main generator and said auxiliary generator and discharging the air through an opening of said stationary frame to the atmosphere.

References Cited in the file of this patent

UNITED STATES PATENTS

| Number | Name | Date |
|---|---|---|
| 508,646 | Thomson | Nov. 14, 1893 |
| 653,088 | Hutin et al. | July 3, 1900 |
| 1,508,096 | Garner | Sept. 9, 1924 |
| 1,654,305 | Nottage | Dec. 27, 1927 |
| 2,431,067 | Minchin | Nov. 18, 1947 |